Jan. 21, 1936.  H. HEINE  2,028,718
BALL BEARING FOR SCIENTIFIC INSTRUMENTS
Filed July 2, 1932   2 Sheets-Sheet 1
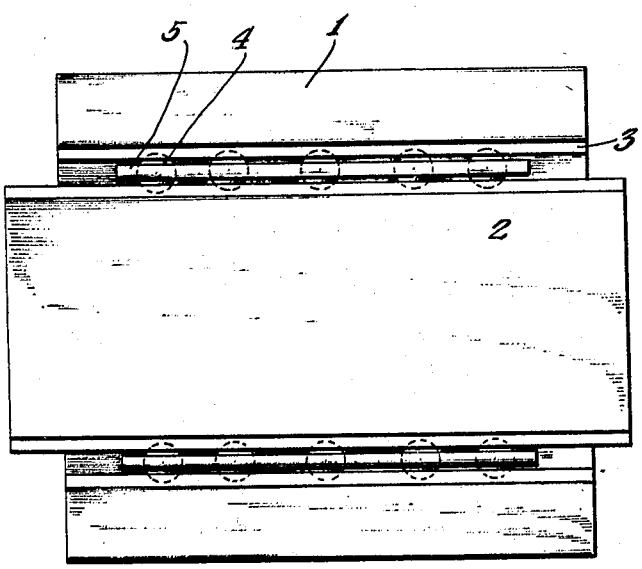
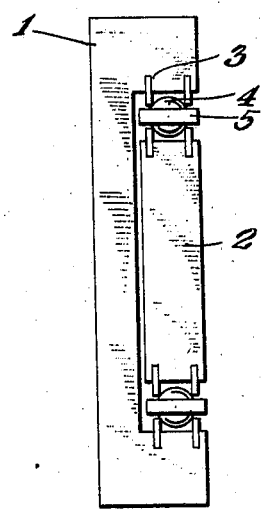
INVENTOR
Hermann Heine
BY
ATTORNEY Jan. 21, 1936. H. HEINE 2,028,718
BALL BEARING FOR SCIENTIFIC INSTRUMENTS
Filed July 2, 1932 2 Sheets-Sheet 2
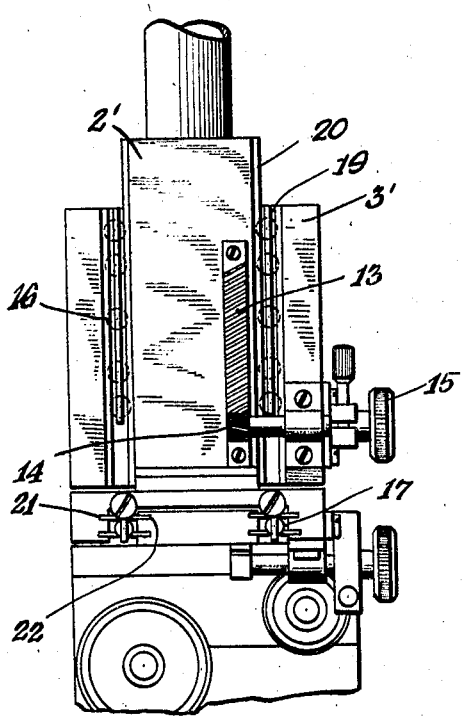
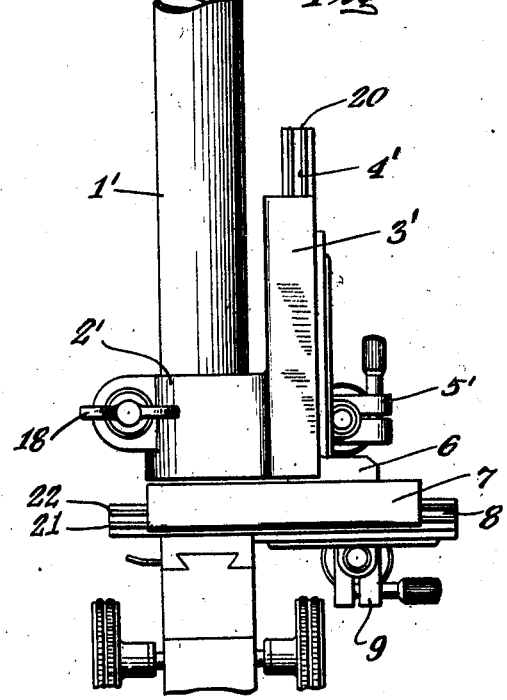
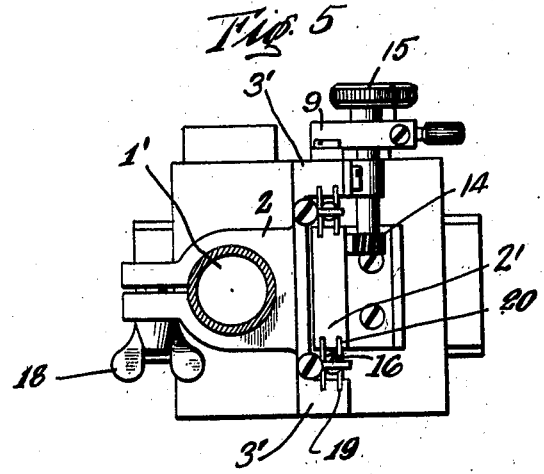
INVENTOR
Hermann Heine
BY
George C. Heine
ATTORNEY Patented Jan. 21, 1936

2,028,718

UNITED STATES PATENT OFFICE 2,028,718

BALL-BEARING FOR SCIENTIFIC INSTRUMENTS

Hermann Heine, Wetzlar, Germany, assignor to Ernst Leitz, Optische Werke, Wetzlar, Germany Application July 2, 1932, Serial No. 620,582
In Germany July 9, 1931

1 Claim. (Cl. 308—6)

This invention relates to improvements in ball-bearings, particularly ball-bearings used with optical, physical and similar instruments of a scientific nature, and it is the principal object of my invention to provide a ball-bearing of an extremely simple and therefore inexpensive construction, yet durable and highly efficient in operation.

Another object of my invention is the provision of a ball-bearing the ball races of which are formed by elastic, yielding steel bands or springs to form a dust proof bearing.

In the manufacture of the ball-bearings now in use it is customary to cut into a body of hard material a V-shaped rill or groove or rounded channel corresponding to the rounded form of the ball, or such a grooved hard metal body is engaged with a body of soft metal. This construction requires an exact fitting of the grooves to the balls requiring an accurate work which necessarily made the manufacture of ball-bearings expensive.

In order to avoid these disadvantages, I have constructed a simple and inexpensive ball-bearing by providing a smooth surface of soft or hard material with two incisions distanced from one another for about the thickness of the balls, and by placing into these incisions bands of springy material of a length corresponding to the length of the bearing to be constructed. In this manner the ball races are formed by two oppositely disposed spring bands yielding to such an extent only as to allow a ball expansion, thus it will not be necessary to construct an accurately worked bearing and consequently the construction of such a bearing will be very inexpensive. The spring bands made of hard material can readily be constructed, and the upper edges of the bands engaged by the balls may be suitably beveled.

These and other objects and advantages of my invention will become more fully apparent as the description thereof proceeds, and will then be specifically pointed out in the appended claim.

In the accompanying drawings forming a material part of this disclosure:

Fig. 1 is a plan view of a ball-bearing constructed according to my invention.

Fig. 2 is an end view thereof.

Fig. 3 is a front elevation of an optical instrument equipped with ball bearings constructed according to my invention.

Fig. 4 is a side elevation thereof, and

Fig. 5 is a top end view of the instrument.

As illustrated in Figures 1 and 2, a plate 1 of suitable material has formed therewith a central depression in which is guided a displaceable carriage 2 on ball bearings constructed according to my invention. The side walls of the depression and of the carriage are provided with longitudinally extending incisions or slits in which the spring bands 3, preferably steel springs are located between which the balls 4 are guided in their cages 5.

As illustrated in Figures 3, 4 and 5, in an optical instrument having a vertical post 1' a carriage 2' is vertically displaceable between guides 3' by means of a rack 13 engaged by a pinion or gear 14 adapted to be operated by a knob 15 on its shaft adapted to be clamped in position by means of the clamping device 5'.

The inner walls of guides 3' and the outer carriage walls are provided with incisions for the reception of the spring bands 19, 20 for the balls 16 in their cages. A horizontally disposed carriage 7 is displaceable between guides 8 and the walls of the same are provided with incisions for the reception of the steel bands 21, 22 for the balls 17 in their cages, the carriage to be clamped in position by means of the clamping device 9.

In use the side edges of the carriages and guides are provided with incisions of the proper length for the reception of the spring steel bands and the balls are guided between the same in their cages.

It will be understood that I have described and shown the preferred forms of my invention as a few examples only of the many possible ways to practically construct the same, and that I may make such changes in the constructional arrangement and in the construction of the minor details as come within the scope of the appended claims without departure from the spirit of my invention and the principles involved.

Having thus described my invention, what I claim as new and desire to secure by Letters Patent is:

In a ball bearing for optical, physical or like instruments a plate having formed therewith a central depression, and its side walls provided with longitudinally extending incisions or slots, a displaceable carriage guided in said depression and having its side walls also provided with longitudinally extending incisions or slots, two substantially similar narrow strips of flexible, wear resisting spring steel, the free edges of said strips constituting the guide tracks for the balls and the opposite edges of said strips held in said incisions, to form a yielding ball bearing to accommodate balls of varying sizes.

HERMANN HEINE.